June 14, 1932.  E. M. SHANNON  1,863,506
SIX-WHEEL TENDER TRUCK
Filed Dec. 12, 1931  3 Sheets-Sheet 1
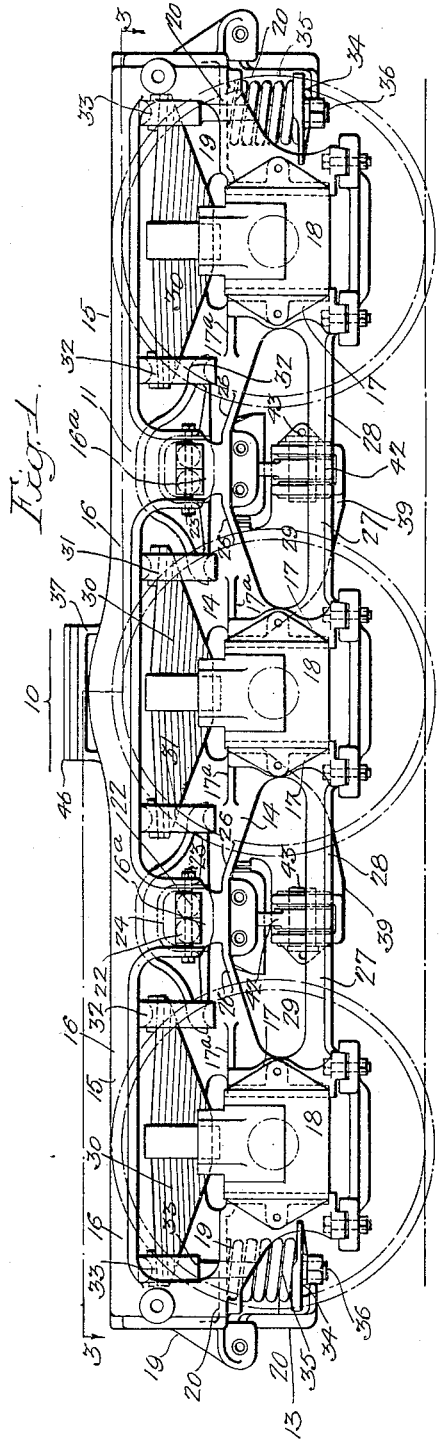

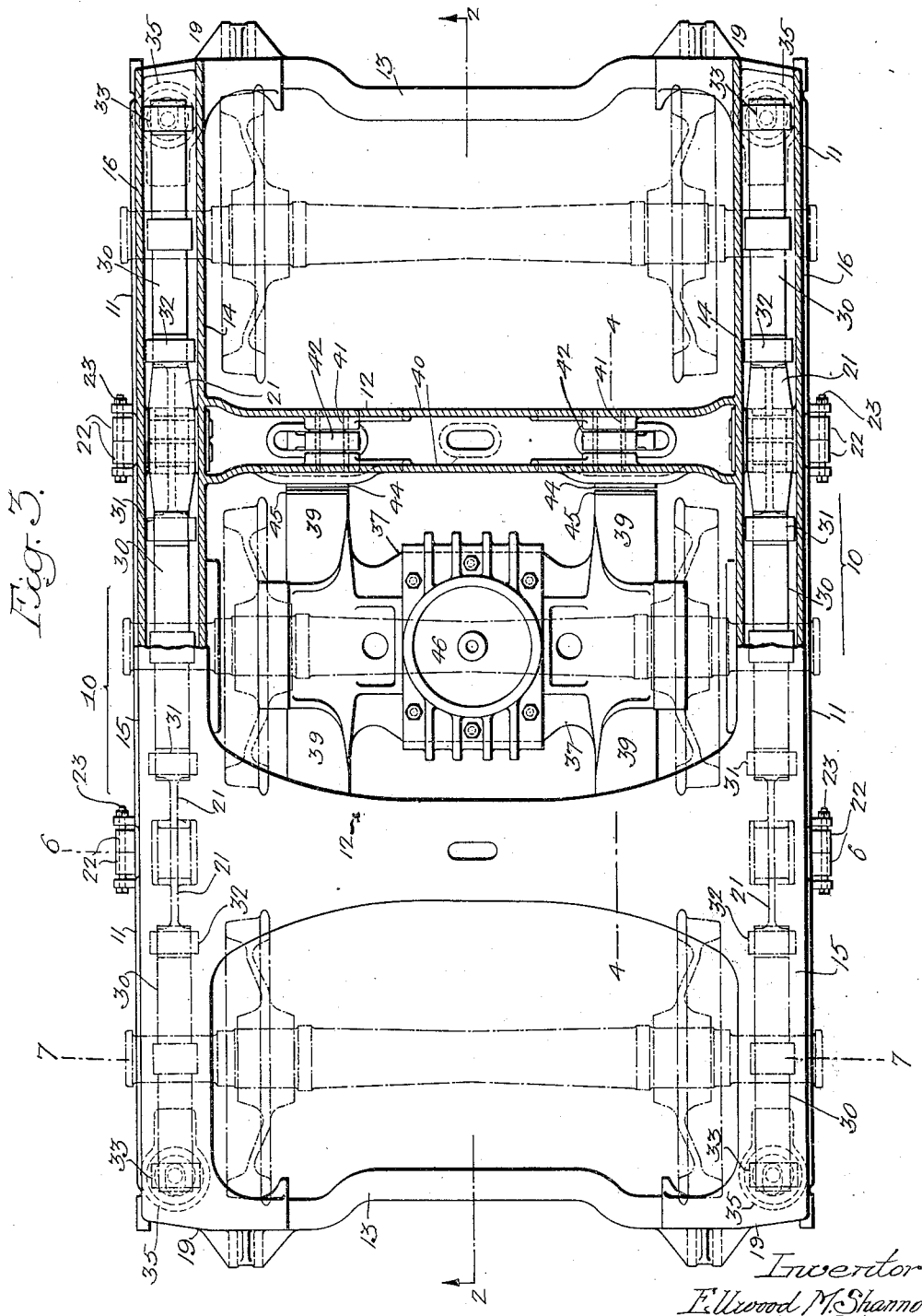

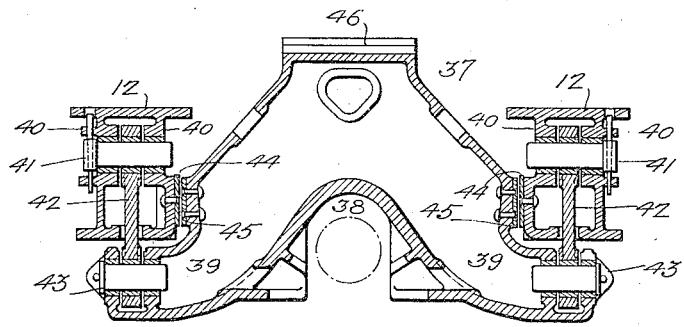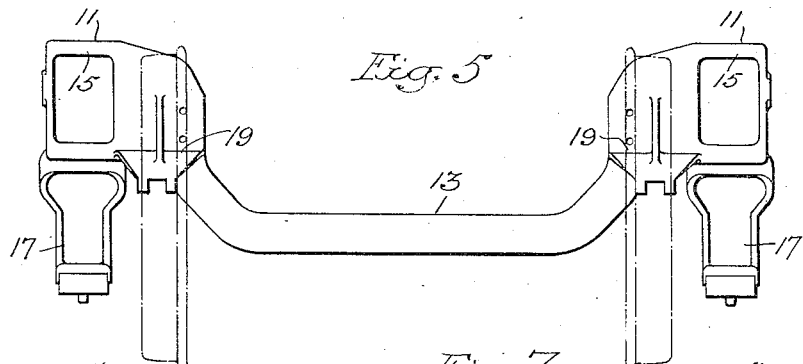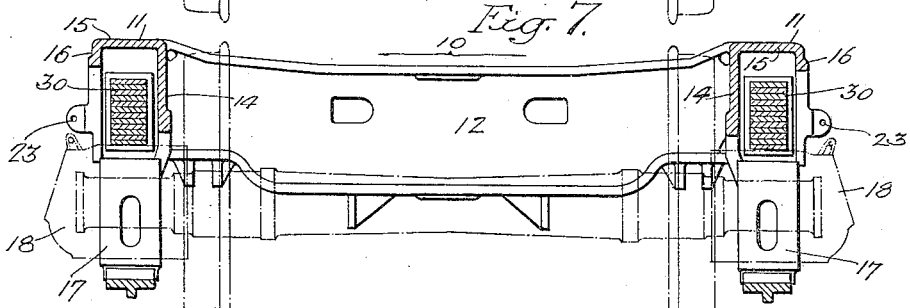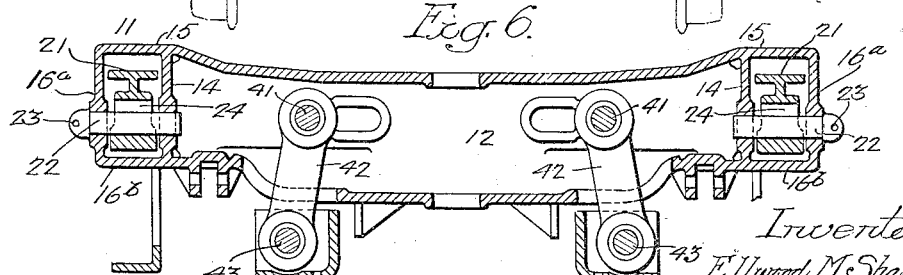

Patented June 14, 1932

1,863,506

UNITED STATES PATENT OFFICE

ELLWOOD M. SHANNON, OF BALA, PENNSYLVANIA

SIX-WHEEL TENDER TRUCK

Application filed December 12, 1931. Serial No. 580,691.

My invention relates to improvements in six-wheel trucks, particularly those adapted for use under the tender of a locomotive.

One object of my invention is to make the frame of the truck as an integral casting, the parts being so arranged that the equalizing mechanism at each side of the truck will be exposed to view and accessible for repairs when necessary, without dismantling other parts of the truck.

A further object of the invention is to so construct the side frames of the truck as to provide a deep web at the inner side of the frame with an extended upper plate member having a comparatively deep outer depending flange, the space below the flange being open substantially the full length of the truck, so as to expose the equalizing mechanism of the truck.

The invention also relates to certain improvements in a truck having a deep inner web and overhanging top member and pedestals made integral with the frame, the pedestals being connected at their lower ends by angular tie members, also made integral with the frame.

In the accompanying drawings:

Fig. 1 is a side view of my improved six-wheel truck;

Fig. 2 is a longitudinal sectional view on the line 2—2, Fig. 3;

Fig. 3 is a plan view partly in section on the line 3—3, Fig. 1;

Fig. 4 is a transverse sectional view on the line 4—4, Fig. 3;

Fig. 5 is an end view;

Fig. 6 is a transverse sectional view on the line 6—6, Fig. 3;

Fig. 7 is a transverse sectional view on the line 7—7, Fig. 3; and

Fig. 8 is a detached side view of one of the equalizing levers.

Referring to the drawings: 10 is the frame of the truck, consisting of side members 11—11, intermediate cross members 12—12 and end members 13—13. In the present instance these several members are made as an integral casting. Each side member of the truck has a deep vertical web 14 on its inner side and has an integral top member 15, which extends the full length of the truck and projects outward beyond the vertical web 14 and has a deep flange 16 at its outer edge, Figs. 1 and 7. Located under this overhanging portion of each side member is the side equalizing mechanism. 17 are the pedestals of the truck in which are mounted the axle boxes 18, which may be of any ordinary type. The pedestals project outwardly from the web and are reinforced at their upper edges by ribs 17a. The end pedestals are formed integral with the enlarged portion 19 at the ends of the truck, in which are located the coil springs in which are provided seats 20 for the end coil springs of the equalizing mechanism. The deep flange 16 of the frame midway between the axle boxes is extended downwards to form a bearing 16a for the pivot pins 22 for the equalizing levers 21, shown in full lines in Fig. 1, and pivot pins 22 in the present instance are arranged side-by-side and are secured in position by bolts 23. The equalizing lever is slotted at 24 to receive these pins and has segmental bearings 25, Fig. 8, which fit the underside of the pins, and the pins act as a fulcrum for this lever. It will be understood, however, that a single pin may be used without departing from the essential features of the invention. The extension 16a of the flange is connected to the vertical web by a horizontal web 16b, shown in Fig. 6, in order to strengthen the bearings for the pins on which the equalizing levers are mounted.

It will be noticed that the main longitudinal webs of the side frames extend below the top of the pedestals and form braces for the pedestals, and ribs 26 connect the vertical webs at this point with the outer bearing 16a for the pivot pins of the equalizing levers, see Fig. 1. The web is extended to the lower portions of the boxes as shown at 27, and this web is reinforced by a flange 28, Fig. 1, which makes the lower portion 27 of the web angular in cross-section.

Between the portion 27 of the web and the main body of the web 14 is an opening 29, which extends from one pedestal to another, so as to expose to view the swing link mechanism which connects the bolster to the body of the truck.

Resting on the axle boxes 18 are semi-elliptical springs 30. The ends of the central spring are connected to the ends of the equalizing levers on each side thereof by links 31, and the other ends of the equalizing levers are connected to one end of each end spring by links 32. Attached to the outer end of each end spring are links 33, which have at their lower ends spring plates 34, on which are mounted coil springs 35, which bear against the underside of the horizontal integral plates 20 of the frame. Each plate has an opening therein for the free passage of the link and the coil springs can be adjusted by nuts 36 on the ends of the links 33.

By the above construction it will be seen that all the equalizing springs are exposed at the side of the truck, as well as the major portions of the equalizing levers, so that the equalizing mechanism can be readily inspected from the side of the truck, and in the event of any repairs all or any part of the equalizing mechanism can be removed from the side of the truck without dismantling other portions of the truck.

In the vertical webs 40 of the cross member 12 are pivot pins 41 from which are hung the links 42, connected to the arms 39 by pins 43. On the cross member are wear plates 44 and opposite these wear plates 44 are wear plates 45 on the bolster. The bolster has the usual center bearing 46 on which are mounted the bearing for the body bolster of the tender or other car body.

I claim:—

1. The combination in a six-wheel truck, of a frame consisting of side members and transverse connecting members made in a single casting, each side member having a deep web on the inner side of the longitudinal center line of the side frame; a top member projecting over the space on the outside of the web and having a deep downturned flange acting to reinforce the side frame, said flange having depending portions forming the outer bearings for the pivots of equalizing levers; pedestals projecting outwardly from the web; axle boxes; equalizing mechanism extending the full length of the truck, consisting of springs; equalizing levers and links, the springs resting upon the axle boxes and the equalizing levers pivotally mounted on pins supported by the longitudinal web and the depending portions of the upper flange; links connecting the levers with the springs; and links connecting the outer ends of the end springs with the frame.

2. The combination in a six-wheel truck, of an integral frame consisting of side members and transverse connecting members, said transverse members being on each side of the center of the truck, each side frame having a longitudinal web on the inner side of its longitudinal center line; a top plate projecting outwardly from the upper edge of the said web, said top plate having a depending flange extending the full length of the side frame; a series of pedestals projecting outwardly from the web; axle boxes between the several pedestals, the longitudinal web extending below the line of the upper edges of the pedestals; and angular bars connecting the lower ends of the pedestals, the vertical webs of the bars being in line with the longitudinal web of the frame.

3. The combination in a six-wheel truck, of a frame made in a single casting and consisting of longitudinal side frames; cross members located one on each side of the transverse center line of the truck and end frames; a bolster suspended from the cross members, each side frame having a deep vertical web located on the inner side of the center of the said side frame and extending the full length of said frame; a top plate integral with the web and extending outwardly therefrom and having a deep downturned flange extending the full length of the side frame, said flange having two depending portions connected at their lower ends to the web, the longitudinal web and the depending portion having bearings; pivot pins mounted in the bearings; equalizing levers mounted on the pins; integral pedestals projecting from the web and boxes located between the pedestals; semi-elliptical springs mounted on the boxes; links connecting the springs with the equalizing levers; links connecting the outer end of each end spring with the frame, said links having spring seats at their lower ends; and coil springs mounted between the spring seats and the frame, the frame being open at the side to expose the semi-elliptical springs and portions of the equalizing levers.

ELLWOOD M. SHANNON.